(No Model.) 3 Sheets—Sheet 1.

G. D. BURTON.
APPARATUS FOR ELECTRIC THERMAL TREATMENT OF METALS, ORES, &c.

No. 585,019. Patented June 22, 1897.

WITNESSES.

INVENTOR (No Model.) 3 Sheets—Sheet 2.

G. D. BURTON.
APPARATUS FOR ELECTRIC THERMAL TREATMENT OF METALS, ORES, &c.

No. 585,019. Patented June 22, 1897.

Witnesses

Inventor (No Model.) 3 Sheets—Sheet 3.

G. D. BURTON.
APPARATUS FOR ELECTRIC THERMAL TREATMENT OF METALS, ORES, &c.

No. 585,019. Patented June 22, 1897.

Witnesses

Inventor

UNITED STATES PATENT OFFICE.

GEORGE D. BURTON, OF BOSTON, MASSACHUSETTS.

APPARATUS FOR ELECTRIC THERMAL TREATMENT OF METALS, ORES, &c.

SPECIFICATION forming part of Letters Patent No. 585,019, dated June 22, 1897.

Application filed November 30, 1896. Serial No. 613,958. (No model.)

*To all whom it may concern:*

Be it known that I, GEORGE D. BURTON, of Boston, in the county of Suffolk and State of Massachusetts, have invented certain new and useful Improvements in Apparatus for an Electric Thermal Treatment of Metals, Ores, &c., of which the following, taken in connection with the accompanying drawings, is a specification.

My invention relates to an apparatus for heating metals and ores for forging, melting, welding, brazing, and other purposes by means of a voltaic arc sprung between the said metals or ores and an electrolytic solution, and has for its object the construction and arrangement of devices for maintaining, directing, and regulating the flow of a stream of an electrolytic solution; also for maintaining the solution at the required heights in the tanks and wells; also for supporting the articles to be acted upon and for supplying them with the required electric currents. These objects I attain by the mechanism shown in the accompanying drawings, in which—

Figures 1, 4:
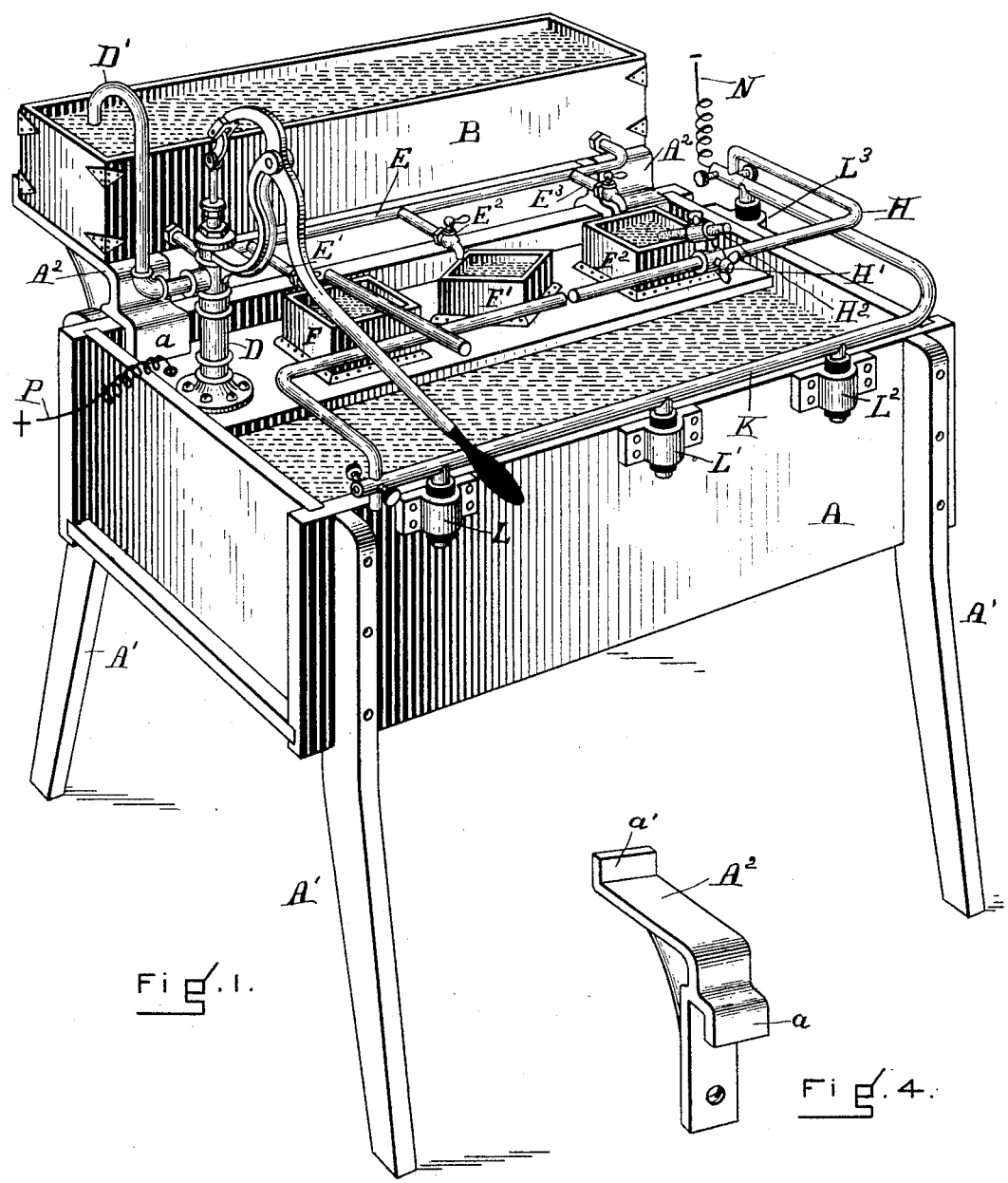
Figure 2:
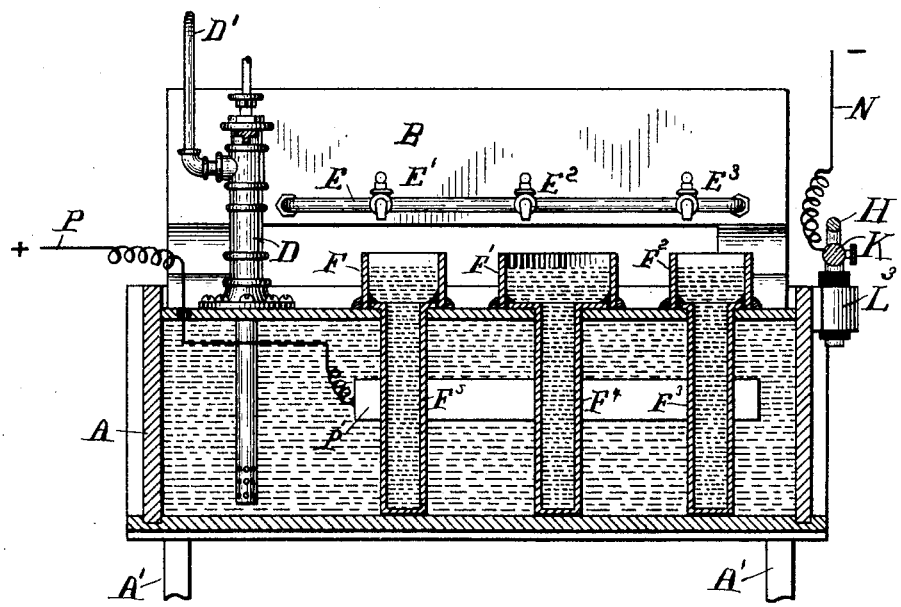
Figure 3:
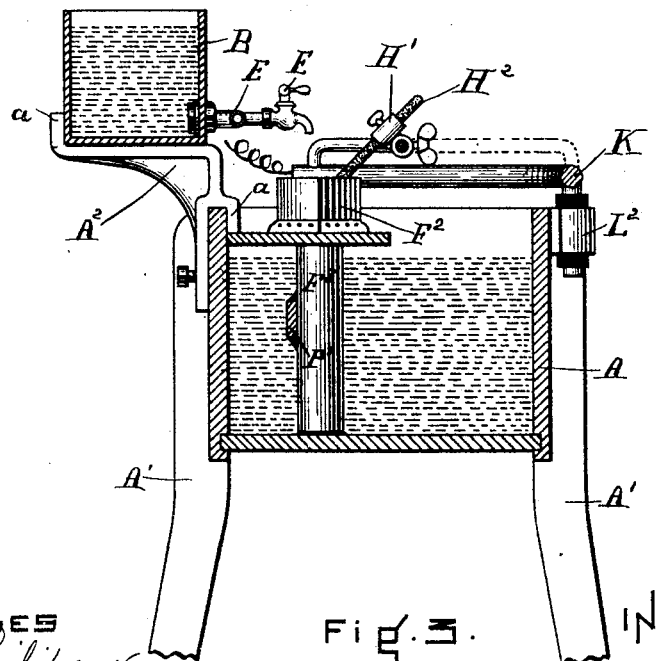
Figure 5:
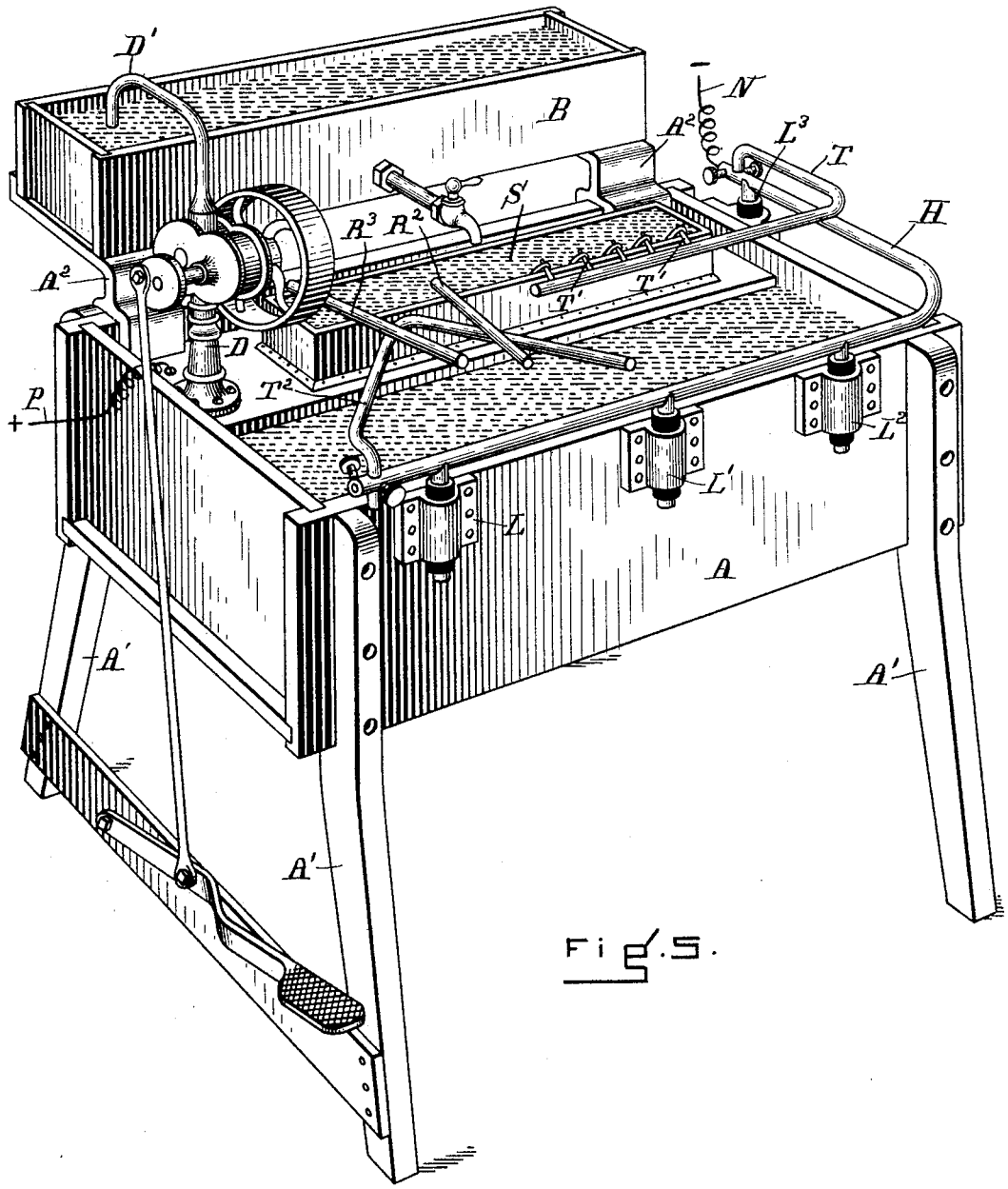

Figure 1 is a view in perspective showing my apparatus complete, a hand-pump being represented as a means in this case for transferring the electrolytic solution from one tank to another and into the wells from the upper tank. Fig. 2 is a view showing the main tank in longitudinal vertical section and the higher tank in elevation. Fig. 3 is a view showing the apparatus in vertical cross-section. Fig. 4 is a perspective view showing a bracket that is in use for supporting the higher tank. Fig. 5 shows in perspective a modified form of my apparatus.

The tanks for holding the electrolytic solution are represented by A and B, the tank A being the main or working tank and B a tank for drawing a supply from to keep the fluid in the main tank and wells at a proper level.

The electrolytic bath disposed in the vessel or tanks A and B consists of any suitable electrolyte having a density greater than that of water and capable of evolving hydrogen, being an electrolyte which will cause, with the electric current under proper conditions, the formation of a voltaic arc between the metal to be heated and the solution. It may consist of an alkaline watery solution or an acid solution containing a metallic base, preferably the latter.

The solution preferably consists of water, carbonate of soda, and borax in the proportion of ten gallons of water, eight pounds of carbonate of soda, and one pound of borax. A bath of this character does not give off offensive gases and does not form objectionable films on the surface nor injure the metal being treated.

Instead of the solution described I have used a solution of sodium carbonate or sal-soda of a specific gravity of 1.105 at 84° Fahrenheit; also a solution of equal parts of sal-soda and potassium bitartrate of a specific gravity of 1.055 at 77° Fahrenheit.

Another and very important use of the supply-tank is to furnish streams of the solution in any desired size, the size to be regulated by the stop-cocks $E'$ $E^2$ $E^3$. The amount of electric current (in amperes) may be regulated by the size of the piece or pieces heating.

The invention consists, further, in the art of working metal by immersing or partially immersing the metal to be heated in a watery liquid and subjecting it to the heating action of an electric arc formed between it and the liquid until it attains the required degree of plasticity and then subjecting the metal so heated to a forging, welding, or shaping operation.

One advantage of forming a heating-arc between the metal and the liquid is that the arc at once adapts itself to the shape of the metal and surrounds or partially surrounds it, whereby a quick and uniform heating is effected.

Another advantage of my apparatus is the absence of oxygen and prevention of oxidation or scaling of the metal.

The pump D is of ordinary construction and serves to draw fluid from the main tank A and force it through the pipe $D'$ into the upper tank B. By the arrangement of the two tanks the pump D, the pipe E, the faucets $E'$ $E^2$ $E^3$, and the wells F $F'$ $F^2$ a very great variety of work may be accomplished, as will be explained.

K is a metallic rest electrically connected by the wire N to the negative source of electrical supply. This rest K is supported by the clamping-pieces L L' L² L³ and completely insulated from the tank and from the electrolytic solution in the tank. H is a second metallic bar and is connected, as shown, to the first bar K. These bars K and H serve as rests for the tongs of the operator or for the bar or bars of metal that are to be heated.

The main tank A is supported on legs A' A' and has bolted to it bracket-pieces A². These bracket-pieces (one of which is shown in perspective in Fig. 4) are formed with overhanging pieces $a$ and stop-pieces $a'$, as shown. By connecting the second tank B to the main tank A by means of the bracket-pieces, made as described, it is very easy to dismount the second tank, and as the bars K and H and legs A' A' can be readily detached the whole apparatus may be quickly put into a convenient form for transportation.

A modified form of my apparatus is shown in the drawings, Fig. 5, in which the pump is of the rotary class and is shown with a foot-treadle attachment. The pump may be driven by a motor or other source of power, if desired.

In Fig. 5 I have shown an open hearth S, which may be connected to the solution in the main tank by means of a well or wells like those indicated by $F^3 F^4 F^5$ in Fig. 2 and connected by a conductor-plate (like the one indicated by P') to the positive supply P of electricity. (See Fig. 2.)

For convenience of heating links or other small articles a conductor T, Fig. 5, is provided with metallic pins T' T', to which small articles may be connected, as shown. A conductor T², bent as shown, is used for the purpose of allowing the user to subject any portion of a rod ($R^3 R^2$, for instance) to the heating action of the current.

To use my apparatus, the terminals N and P are connected, respectively, to the negative and positive of the generator or source of electric supply.

The current used has a voltage of from one hundred and forty to five hundred and an amperage of from six upward, according to the size or quantity of the metal being heated. A heating-arc for brazing may be formed by causing the end of a conductor (like the piece of carbon H² in the clamp H') to come in contact with the solution in the well F², Fig. 1, and then withdrawing it, so that an electric arc will form between the end of the carbon and the solution. The length of the arc may be regulated at will by simply moving the carbon so that its point will be nearer or farther away from the solution. The article to be brazed is then passed across the flame and brazed.

By arranging the tanks and conductors as shown in my drawings I am enabled to do a great variety of work in heating for forging, tempering, welding, brazing, and in the reduction of ores, &c.

This apparatus constitutes a very convenient forge for a blacksmith and also an economical one, as no current is employed when the article is not being heated.

The term "metal," as used in the specification and claims, is intended to include that substance in any form.

The top of the wells F F' F² consists of hearths formed of non-conducting material, such as fire-clay, capable of withstanding a very high degree of heat. The metal to be heated is placed across these hearths, and that portion between the walls of said hearths and coming in contact with the solution is heated to the required degree. It will be observed that the top of the hearths extends above the top of the tank A. Therefore a long rod could be passed over the top of the hearth and heated for a space of a few inches at its center. Should these hearths wear away or become broken, others can be supplied in their place.

The bottom of the well or wells is composed of lead or other suitable conductive material, to which is connected the positive pole of the electric source.

By raising the tongs or the bar of metal that has been heated out of contact with the negative pole and plunging it into the bath it will become cooled, and, with a suitable bath, such as herein described, the article can be hardened or tempered.

I claim as my invention—

1. In an electrolytic heating device, a main tank adapted to receive the electrolytic solution and provided with a well; in combination with a second tank provided with a fluid-conductor adapted to conduct the solution to the well substantially as described, whereby the well may be kept constantly full to overflowing as set forth.

2. In an electrolytic heating device, a main tank adapted to receive the electrolytic solution and provided with a plurality of wells; the tops of which are above the edge of the main tank, in combination with a second tank provided with a fluid-conductor adapted to conduct the solution to the well substantially as described, whereby the well may be kept constantly full to overflowing, as set forth.

3. In an electrolytic heating device, a main tank adapted to receive the electrolytic solution and provided with a well; the top of which is above the edge of the main tank, in combination with a second tank provided with a fluid-conductor adapted to conduct the solution to the well substantially as described, whereby the well may be kept constantly full to overflowing, as set forth.

4. In an electrolytic heating device, a tank holding an electrolytic solution electrically connected to a source of electrical supply, in combination with one or more wells the upper ends of which are open and above the surface of the fluid in the tank, and are electrically connected with the fluid in the tank, and are adapted to be made to overflow to cause the fluid to connect with the article to be heated, substantially as described.

5. In an electrolytic heating device, a main tank having wells extending above the edge of the tank, in combination with a second tank having outlet-conductors adapted to deliver the fluid contents of the said tank to the said wells in the main tank, and means for providing the fluid with an electrical current, substantially as described.

6. In an electrolytic heating device, the combination of a main tank, a second tank, brackets on main tank adapted to support said second tank, said main tank containing one or more wells to support the metal to be heated, and means for providing the fluid with an electrical current, substantially as described.

7. In an electrolytic heating device, the combination of a main tank with one or more wells, partly above the surface of the liquid in the tank, and means for causing the wells to overflow, said wells constructed irregular in outline, as shown, whereby definite portions of the article to be heated may be exposed to the heating action, substantially as described.

8. In an electrolytic heating device, a receptacle containing an electrolytic solution, said solution connected to a suitable source of electricity, in combination with a brazing device consisting of a carbon electrically connected and brought into electrical connection with the solution, and developing a flame of sufficient intensity to accomplish the brazing, substantially as described.

9. In an electrolytic heating apparatus, a main tank containing an electrolytic solution, a series of open hearths situated above the edge of said main tank, and across which is placed the metal to be heated, said hearths supplied with an electrolytic overflowing solution, substantially as described.

10. In an electrolytic heating apparatus, a main tank containing an electrolytic solution, a well having a non-conducting hearth for supporting the metal to be heated, said hearth extending above the edge of the tank, said hearth also being in contact with the solution in the well and permitting the solution to overflow said hearth during the metal-heating operation.

11. In an electrolytic heating apparatus, a main tank adapted to receive the electrolytic solution and provided with one or more wells the tops of which are above the edge of the main tank, said wells electrically connected to a proper source of electricity, and adapted to support the metal to be heated in combination with means for elevating the solution from the main tank, to a second tank, and a second tank adapted to contain the electrolytic solution which is transferred from tank to tank, at will, as described.

12. In an electric metal-working apparatus, the combination of a well, an electrolytic solution therein, means for supplying the solution to said well and causing an overflow thereof, and electric conductors connecting said solution with the positive pole of the electric source.

In testimony that I claim the invention above set forth I affix my signature, in presence of two witnesses, this 15th day of June, 1896.

GEO. D. BURTON.

Witnesses:
E. F. PHILIPSON,
JOHN J. MOORE.